(12) United States Patent
Gabriel et al.

(10) Patent No.: US 10,197,082 B2
(45) Date of Patent: Feb. 5, 2019

(54) PRE-PLATED SPLINE FORMED FASTENER AND METHOD FOR MAKING SAME

(71) Applicant: Illinois Tool Works Inc., Glenview, IL (US)

(72) Inventors: William L. Gabriel, Barrington, IL (US); Kenn C. Prinds, Egtved (DK); Donald E. Bergstrom, Lindenhurst, IL (US); Guenther R. Kram, Bartlett, IL (US)

(73) Assignee: Illinois Tool Works Inc., Glenview, IL (US)

( * ) Notice: Subject to any disclaimer, the term of this patent is extended or adjusted under 35 U.S.C. 154(b) by 195 days.

(21) Appl. No.: 15/087,545

(22) Filed: Mar. 31, 2016

(65) Prior Publication Data

US 2016/0312814 A1    Oct. 27, 2016

Related U.S. Application Data

(60) Provisional application No. 62/151,708, filed on Apr. 23, 2015.

(51) Int. Cl.
| | |
|---|---|
| *B21G 3/30* | (2006.01) |
| *F16B 15/06* | (2006.01) |
| *F16B 15/00* | (2006.01) |
| *C23C 2/06* | (2006.01) |
| *C23C 2/38* | (2006.01) |
| *C23C 2/26* | (2006.01) |

(52) U.S. Cl.
CPC ............ *F16B 15/06* (2013.01); *B21G 3/30* (2013.01); *C23C 2/06* (2013.01); *C23C 2/26* (2013.01); *C23C 2/38* (2013.01); *F16B 15/0092* (2013.01)

(58) Field of Classification Search
CPC ......... B21B 1/16; B21B 1/163; B21B 13/103; B21G 3/005; B21G 3/12; B21G 3/16; B21G 3/18; B21G 3/20; B21G 3/30; C23C 2/36; C23C 2/38; F16B 15/0092; B21D 13/045
See application file for complete search history.

(56) References Cited

U.S. PATENT DOCUMENTS

| | | | | |
|---|---|---|---|---|
| 1,632,703 A | * | 6/1927 | Humphris | ............... B21G 3/16 470/11 |
| 2,014,746 A | * | 9/1935 | Robergel | ............... B21G 3/005 411/452 |

(Continued)

FOREIGN PATENT DOCUMENTS

| | | | | | |
|---|---|---|---|---|---|
| JP | 62-60854 A | * | 3/1987 | ............... | C23C 2/34 |
| JP | 62-267040 A | * | 11/1987 | ............... | B21H 3/02 |

*Primary Examiner* — Edward Tolan
(74) *Attorney, Agent, or Firm* — Levenfeld Pearlstein, LLC

(57) ABSTRACT

A method for making a plated spline nail includes plating an elongated wire with a corrosion resistant material, passing the wire through a forming machine having rollers configured with protrusions formed thereon and extending outwardly therefrom to form grooves in the wire. cutting the wire to a desired length and forming a head, and a point on the wire to form the nail. The nail may have ring shanks formed therein after the head and point are formed. A lubricant may be applied to the nail and/or the forming machine prior to forming the ring shanks and/or prior to passing the wire through the forming machine to form the grooves in the wire. A nail formed by pre-plating the wire, and a nail formed by the method are also disclosed.

7 Claims, 3 Drawing Sheets

(56) References Cited

U.S. PATENT DOCUMENTS

| | | | | |
|---|---|---|---|---|
| 2,718,647 A | * | 9/1955 | Raible | B21G 3/18 |
| | | | | 411/424 |
| 2,821,727 A | * | 2/1958 | Corckran | B21B 1/163 |
| | | | | 470/122 |
| 3,142,208 A | * | 7/1964 | Properzi | B21B 13/103 |
| | | | | 184/6.12 |
| 4,368,632 A | * | 1/1983 | Thrash | B21F 45/00 |
| | | | | 29/623 |
| 4,549,420 A | * | 10/1985 | Cloostermans-Huwaert | |
| | | | | B21B 1/18 |
| | | | | 72/206 |
| 4,637,768 A | * | 1/1987 | Rabe | B21G 3/30 |
| | | | | 411/452 |
| 4,833,906 A | * | 5/1989 | Potucek | B21G 3/28 |
| | | | | 470/121 |
| 5,033,181 A | * | 7/1991 | Lat | B21G 3/20 |
| | | | | 29/433 |
| 5,081,732 A | * | 1/1992 | Steinhilber | B21G 3/12 |
| | | | | 470/129 |
| 5,542,886 A | * | 8/1996 | Scott | B21G 3/18 |
| | | | | 470/136 |
| 5,836,826 A | * | 11/1998 | Haraminac | B21B 13/103 |
| | | | | 470/117 |
| 7,665,942 B2 | * | 2/2010 | Tadros | F16B 15/06 |
| | | | | 411/451.1 |
| 7,845,889 B2 | | 12/2010 | Shelton et al. | |
| 8,113,027 B2 | | 2/2012 | McDonald et al. | |

\* cited by examiner

PRE-PLATED SPLINE FORMED FASTENER AND METHOD FOR MAKING SAME

CROSS-REFERENCE TO RELATED APPLICATION DATA

This application claims the benefit of and priority to Provisional U.S. Patent Application Ser. No. 62/151,708, file Apr. 23, 2015, the disclosure of which is incorporated herein in its entirety.

BACKGROUND

Grooved fasteners, such as grooved nails are known. Shelton, U.S. Pat. No. 7,845,889, discloses a fastener having a shank having a plurality of longitudinal grooves to reduce the amount of material needed to create the nail and increase the holding power of the nail, while only minimally affecting the bending yield strength of the nail and other important properties of the nail.

Such a nail includes a relatively large number of relatively shallow grooves disposed about the circumference of the shank. Formation of the grooves does not alter the geometry of the shank such that the nail can have a full round head. Such grooved fasteners may also include a ring shank (e.g., a ring shank nail) in which circumferential rings are formed in the fastener to further increase the holding power of the fastener.

Grooved fasteners work well for their intended purpose. However, fasteners such as nails formed from common steel typically require a coating or plating of some type to prevent corrosion. One commonly used coating or plating is a zinc coating applied in a galvanizing process. Galvanizing provides a corrosion-resistant coating on the underlying fastener and also serves as a sacrificial anode in the event the coating is scratched away from the underlying material.

One drawback to galvanizing the nails is that, especially with smaller gauge nails, the zinc will plate the surfaces that define the grooves and the spaces between the rings in a ring shank nail. This can tend to reduce the holding power of the nails.

Accordingly, there is a need for a plated spline fastener or grooved fastener that includes a corrosion resistant coating and a method for making same. Desirably, such a coating is applied so as to minimally, if at all, negatively affect the holding power of the fastener. More desirably still, such a coating is applied so as to not overcoat the surfaces that define the grooves and so as to not "fill" the spaces between the rings of a ring shank nail.

SUMMARY

A method for making a plated spline nail includes plating an elongated wire with a corrosion resistant material, passing the wire through a forming machine having rollers configured with protrusions formed thereon and extending outwardly therefrom to form grooves in the wire, cutting the wire to a desired length, and forming a head, and a point on the wire to form the nail. The method can further include forming ring shanks on the nail.

A lubricant can be applied to the nail prior to forming the ring shanks on the nails and/or applied to the wire or the forming machine prior to passing the wire through the forming machine to form grooves in the wire. In an embodiment, the nail is cleaned after forming the nail. The method can include forming a full round head on the nail. In an embodiment, the grooves are formed asymmetrically about the circumference of the shank. In such an embodiment, the grooves are formed such that no two grooves are 180 degrees opposed to one another. The grooves can be formed equally spaced from one another.

Accordingly, in an embodiment a nail includes a head, a point and a shank extending from the head to the point and having a circumference, an outer diameter, and a longitudinal axis, and defining an outer periphery. The nail has an odd number of smooth, substantially identical semi-circular grooves formed in the shank and extending straight, longitudinally along the longitudinal axis of the shank, the grooves each define a nadir.

A corrosion-resistant coating is on the nail. The corrosion-resistant coating is a zinc or zinc-based metallic material. In an embodiment, no two nadirs are diametrically opposed to one another such that no two grooves are 180 degrees opposed to one another. The grooves are configured to reduce an amount of material needed to create the nail and provide areas of increased work hardening of the nail an intersection of the outer periphery and each of the plurality of grooves. The amount of material needed to create the nail is reduced by about six percent as compared to a non-grooved nail having a shank outer diameter that is the same as the outer diameter of the shank of the nail and the bending yield strength is reduced by about three percent as compared to a non-grooved nail having a shank outer diameter that is the same as the outer diameter of the shank of the nail. In an embodiment the nail includes ring shanks formed in the shank. The ring shanks, similar to the splines, are formed in the pre-plated nail.

A pre-plated spline formed nail is formed by pre-plating a wire with a zinc or zinc-based material and subsequently passing the wire through a forming machine having rollers configured with protrusions formed thereon and extending outwardly therefrom to form a plurality of asymmetric, longitudinally or substantially longitudinally extending grooves in the wire, cutting the wire to a desired length and forming a head, and a point on the wire to form the nail.

These and other features and advantages of the present invention will be apparent from the following detailed description and drawings in conjunction with the appended claims.

DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION

Figure 1:
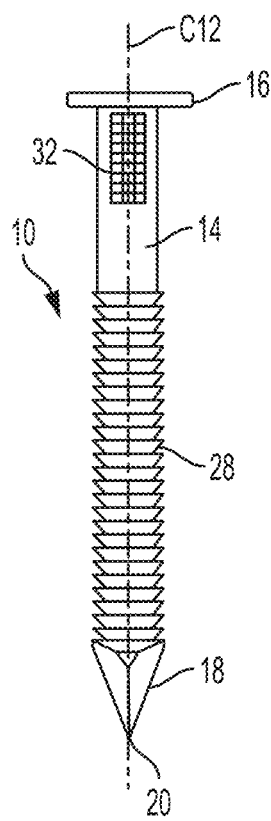
FIG. 1 front schematic illustration of an example of a pre-plated spline formed fastener formed as a nail.

While the present disclosure is susceptible of embodiment in various forms, there is shown in the drawings and will hereinafter be described one or several preferred embodiments with the understanding that the present disclosure is to be considered an exemplification, and is not intended to be limited to the specific embodiments illustrated.

A spline formed fastener 10 has a shank 12 and a number of grooves 14 formed longitudinally along the shank. Such a fastener 10, for example a spline nail, has been found to simultaneously reduce the amount of material needed to create the nail (as compared to non-grooved prior art nails) and to increase the holding power of the nail 10, while only minimally affecting the bending yield strength of the nail and other important properties of the nail.

Moreover, the relatively high number of grooves 14 combined with the relatively shallow depth of the grooves allows the formation of a desirable full round head 16 of sufficiently large diameter such that pull through resistance of the nail 10 is not significantly affected. It has also been observed that the grooved configurations provide for ease of driving the nails into the substrate. This is particularly significant when cordless tools are used, and even when air (pneumatic) tools are used in that this correlates to less power that is needed to drive the fastener into the substrate. This can perhaps permit the use of smaller tools, or the ability to drive a larger number of nails on a single charge for cordless battery powered tools.

Holding power, or withdrawal strength, refers to the nail's resistance to an axial force (a load parallel to the nail shank 12). Holding power includes not only the nail's resistance to withdrawing from the substrate into which it is driven, but also to the nail's resistance to "pull through." Pull through occurs when the head 16 of the nail 10 is pulled through the structural element being attached to the substrate. Bending yield strength refers to the nail's resistance to bending (a load perpendicular to the nail shank).

Referring to the figures, and in particular, FIG. 1, in a first embodiment, a nail 10 includes a head 16, an elongated shank 12 and a penetrating point or tip 18. The head 16 preferably is round and may be centered over the shank 12 (as shown) or offset from the centerline $C_{12}$ of the shank 12, as will be recognized by those skilled in the art. However, it will be appreciated that the head 16 may be formed in other shapes and geometries.

The shank 12 is generally cylindrical and extends downwardly from the head 16 to the tip 18. The tip 18 is formed at an end of the nail and has a generally pointed end 20 for ease of entry of the nail 10 into a substrate, such as wood. Such a nail construction is more fully disclosed and discussed in the aforementioned patent to Shelton.

The 12 nail includes a plurality of grooves 14 that extend longitudinally along the longitudinal axis or centerline $C_{12}$ of the shank 12, from about the head 16 to about the tip 18 of nail 10. It will be understood that the grooves or splines 14 may not extend full to the head 16 or tip 18, but extend substantially between the head 16 and tip 18. The nail 10 includes a relatively high number of relatively shallow grooves 14 that do not extend deeply into shank 12. The grooves 14 are configured to remove a sufficient amount of material from the nail 10 to create a significant weight reduction (on the order of 6%, and perhaps as high as 10%), but not so much material that a desirable shape and size of the head 16 cannot be retained. That is, the configuration of the grooves 14 permits the shank 12 to maintain a cross-sectional geometry sufficient to support the head 16 having a desirable full round shape of sufficiently large diameter that the pull through resistance of nail 10 is not significantly affected.

In an embodiment, the grooves 14 are substantially fully semi-circular in shape; that is, each groove 14 comprises about a 180 degree semi-circle. A semi-circular geometry for the grooves 14 maximizes material removal from the shank 12, and allows for use of a full round head 16 by maintaining a sufficient cross-sectional geometry of the shank 12 to support such a head 16.

As discussed above, a full round head 16 is advantageous because it provides for high pull through resistance (but it will be appreciated that other head shapes and geometries may be used). By keeping the depth of the grooves 14 shallow, and using a specified number of grooves 14, the nail 10 may desirably incorporate a full round head 16. It has been found that six or more grooves 14 can typically provide a substantially fully rounded head 16.

Figure 2:
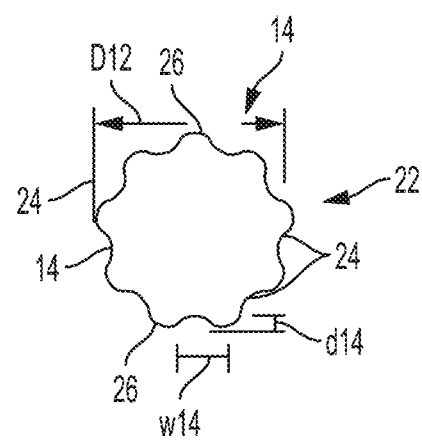
FIG. 2 is a cross-sectional illustration of an example of a pre-plated spline formed nail.
Figure 3:
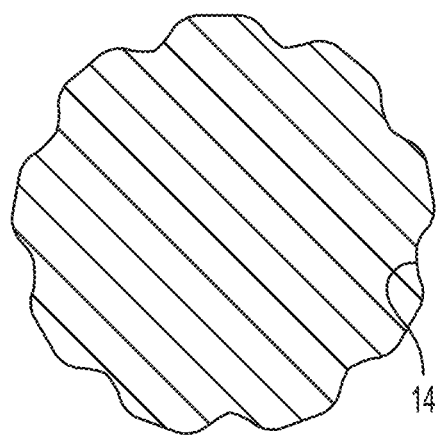
FIG. 3 is a cross-sectional illustration of the shank of the nail.

In an embodiment, the nail 10 includes an odd number of grooves 14 asymmetrically about the circumference of the shank 12. For example, as shown in FIG. 2, the nail 10 may be formed with an odd number (nine, in the illustrated exemplary embodiment) of grooves 14 disposed asymmetrically about the shank 12. In this embodiment, the diameter $D_{12}$ of the shank 12 at the location of each groove 14 is never reduced by more than the depth of any single groove 14. In such an embodiment, any bending or shear forces applied normal and central to a particular groove 14 are resisted at the opposite side of shank 12 by a non-grooved (for example, as indicated at 22) section of the shank 12. Such resistance may desirably increase the bending yield strength of the nail 10. It will be appreciated that in this odd-number groove 14 embodiment, each of the grooves 14 has a nadir (the lowest point in the groove 14, as indicated at 24) and the nadirs 24 are not diametrically opposed to one another; that is, no two grooves 14 are 180 degrees opposed to one another. This prevents inadvertently over-thinning the nail shank 12 and also improves the bending yield and shear strength.

In an exemplary embodiment of the nail 10, the diameter $D_{12}$ of the shank is about 0.129 inches, a common nail size. Each groove 14 has a radius (depth $d_{14}$) of about 0.007 inches and a diameter (width w14) of about 0.014 inches. Again, the use of a relatively high (in the illustrated embodiment, nine) number of relatively shallow (0.007 inches) grooves 14 maintains the geometry of the shank 12 such that a full round head 16 of sufficiently large diameter may be formed on the nail 10. Another advantage of a multitude of grooves 14 is that it provides many sites for work hardening causing improvement in strength, particularly as the chemistry of the nail 10 is increased. It should be noted that the preceding embodiment is one of many possible embodiments, and is presented by way of example only.

As discussed above, the grooves 14 serve to increase the surface area of the shank 12, which increases the contact area between the nail 10 and the substrate into which the nail 10 is driven (as compared to a nail having a non-grooved shank, for example). Such increased contact area may result in increased withdrawal strength of the nail 10. Moreover, the formation of the grooves 14 in the shank 12 creates a localized work hardening effect at the intersections between the outer diameter of the shank 12 and the grooves 14 (e.g., the tangent points as indicated at 26), two of which are identified in FIG. 1.

The localized work hardening effect at the tangent points 26 advantageously increases the bending yield strength of the nail 10 such that the reduction of material associated with forming the grooves 14 does not significantly impact the overall bending yield strength of the nail as compared to a prior art nail having a non-grooved, round shank. Moreover, because the grooves 14 are relatively small and shallow, the localized work hardening effect created by the grooves 14 helps to maintain ductility to allow formation of a round head 16 on the nail 10.

In an embodiment the nail 10 is formed as a ring shank nail. In such a nail a plurality of rings or grooves 28 are formed around the periphery of the shank 12. Ring shank nails provide for greater holding power as compared to standard smooth shank nails. The rings or grooves 28 serve as wedges and provide an interference fit the substrate into which they are driven. The rings 28, which are shown schematically in FIG. 1, can be formed along substantially the entire length of the shank 12, or along only a portion of the shank 12. The nail may also exhibit gripper marks, as indicated at 32, where the shank 12 is gripped to form the nail head 16.

As noted above, such nails 10 are often formed from common steel. As such the nails 10 may be subject to corrosion due to general exposure to the environs, weather related causes (for example, rain and snow), chemical exposure, and the like. These nails are usually coated with a protective coating, such as zinc or a zinc-based product (galvanized) to provide protection from the corrosive environments.

As discussed above, the plating, which, in known nails is applied after forming the nails, will coat the surfaces that define the grooves and the spaces between the rings in a ring shank nail. This can tend to reduce the holding power of the nails.

In a known method, the wire from which the grooved nails are formed is plated prior to forming the nails. In a typical manufacturing process, a wire is formed to a certain diameter. The wire is then drawn through a cassette having a die with multiple oriented rollers, such as that disclosed in McDonald, U.S. Pat. No. 8,113,027, the entirety of the disclosure of which is incorporated herein by reference. Following the formation of the grooves in the wire, the wire is cut, and the heads and tips are formed, and the rings on the shanks are formed. Subsequently, the fully formed nails are then coated, such as by a hot dipped galvanizing method.

While this method works well, as noted above, and the zinc or zinc-based plating will cover the surfaces that define the grooves and the spaces between the rings in the ring shank nail. This can tend to reduce the holding power of the nails.

Accordingly, in a present method, generally, the wire is plated prior to forming the nails. That is, the wire is first plated with, for example a zinc or zinc-based plating in a galvanizing process. Following plating, the wire is drawn to form the grooves, the wire is cut and the head and tips are formed and the rings on the shanks are formed.

More specifically, an embodiment of the method uses pre-plated wire that is supplied in compliance with local codes, to pass US minimum standards of 1 ounce per square foot zinc, or European Union standards for class II or class III constraints (e.g., 275 grams per square meter (g/sq m) & 350 g/sq m respectively). The wire is not necessarily restricted to these standards and can use other than 100% zinc plating. For example, 5% aluminum/95% zinc is in use in Europe for class II compliance. Additionally, 10% aluminum/90% zinc is commonly commercially available and is a further alternative plating material. Other plating materials, for example, chromium or nickel may be used, higher or lower coating/plating weights are also contemplate, and the like.

The core material, that is the raw material that is used to form the nail, is contemplated to be steel, as it possesses the mechanical characteristics required to make a finished fastener that complies with the minimum strength requirements for such a fastener.

The method for making the spline wire (which is subsequently formed into nails) may be entirely in-lined, or the pre-plated wire may be drawn/formed to finish spline size off-line and maintained as work-in-process until manufactured into fasteners in a nail making process machine.

One contemplated method includes critically sizing supplied wire and applying a lubricant, passing the wire through a spline wire rolling cassette, such as that disclosed in the aforementioned patent to McDonald (the spline formed wire may have a critical guide to properly intercept the drive capstan—this may be dependent upon the distance to the approach radius on the drive capstan), pulling, by a capstan, the wire through the drawing die and spline cassette (the drawn/formed wire can be accumulated on carriers or spools, or fed directly into a nail header) forming the nails, and forming the ring shanks. The nails can subsequently be cleaned, collated and packaged.

In one embodiment, the wire and/or the cassette is sprayed or misted with a lubricant, such as a mixture of water and a lubricant to facilitate drawing the wire through the cassette. Lubricating may be required when using certain types of plating or coating on the wire. For example, when a US specification plating of substantially 100 percent zinc is used, misting may be required. In an embodiment, the nails are misted with a lubricant, again, such as a mixture of a lubricant and water, prior to forming the ring shanks in the nail.

Conventional thought was that pre-plating nails prior to forming the splines and ring shanks would result in the coating or plating (e.g., the zinc) rubbing off of or otherwise moving along the nail, thus overly thinning or exposing portions of the underlying material, which could result in exposing areas of the nail material to a corrosion-inducing environment.

Figure 4:
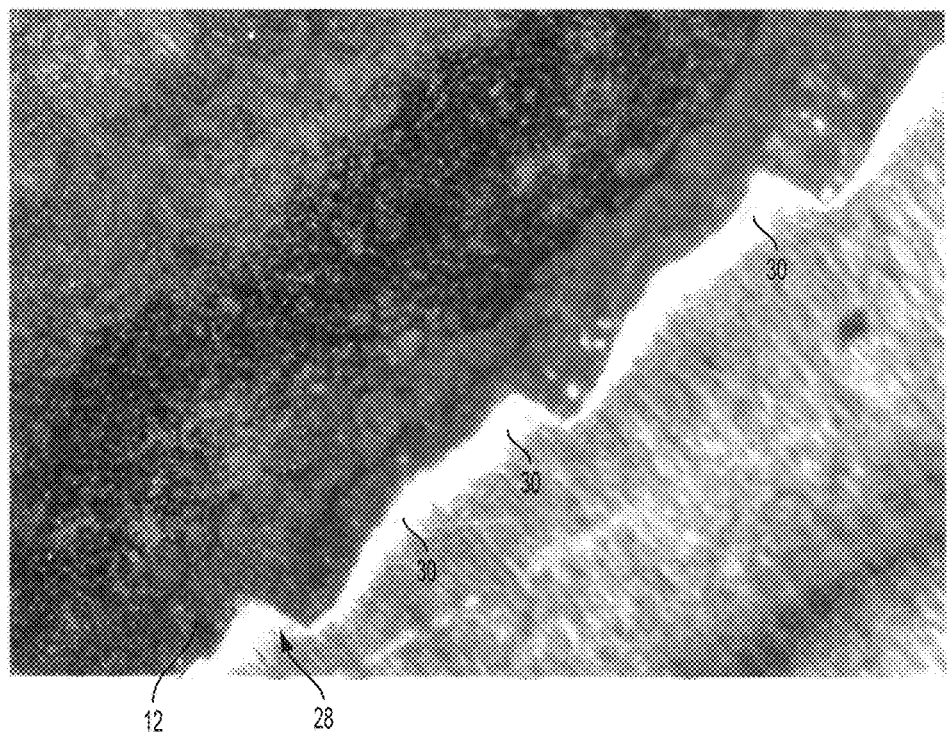
FIG. 4 is an enlarged view of a portion of the ring shanks of the nail of FIG. 2.

However, it was found that forming the splines and ring shanks after plating was possible, with no detrimental effect to the corrosion resistance provided by the plating. Rather, the plating remained sufficiently substantial that the movement of the plating (e.g., the zinc) was nominal. As seen in FIG. 4, which illustrates a localized section of the ring shanks formed in the nail, in a nail formed in accordance with the present method, the plating (indicated at 30) remains substantially in place on the nail 10 material and is not rubbed off of the material, or moved along the material surface to any great extent, even when the splines or grooves 14 and rings 28 are formed after the material is plated.

Moreover, it was found that in forming the heads of the nails, the plating covered substantially the entirety of the head of the nail except for a small central spot on the nail head. That is, when the head was formed, the plated material formed a substantial portion of the top of the head as well as the sides and bottom of the head and the shank of the nail. It was also found that the rings (forming the ring shank) remained plated with no adverse effect.

Samples of nails were prepared and tested to compare nails made in accordance with embodiments of the present method to known nails. In this test, samples of US nominal 0.121 inch diameter, US hot dipped galvanized (100 percent zinc plating) pre-plated round wire nails were prepared and compared to pre-plated spline nails with ring shanks at 20 rings per inch and 32 rings per inch. Some of the nails were coated post formation with an ease of drive coating. The standing height (the height of the nail above the substrate after driving into the substrate) and the holding power were determined, as was the bending yield of a number of the samples. The results of the tests are shown below in Table 1.

TABLE 1

Comparison of Round v. Spline Ring Shank Nails

| Sample No. | Type | Dia. (in) | Dev. Dia | RS RPI | Coating | St. ht. | Hld Pwr | By |
|---|---|---|---|---|---|---|---|---|
| 1 | Round | 0.121 | 0.128 | 20 | Yes | 0.311 | 513.0 | 123.6 |
| 2 | Spline | 0.121 | 0.124 | 32 | Yes | 0.253 | 553.9 | 120.1 |
| 3 | Spline | 0.121 | 0.1255 | 20 | Yes | 0.268 | 465.6 | |
| 4 | Spline | 0.121 | 0.1255 | 20 | No | 0.35 | 362.4 | |
| 5 | Spline | 0.121 | 0.124 | 32 | No | 0.302 | 501.9 | |

In Table 1, Type indicates the type of nail, either a round nail or a spline nail, Dia. (in) is the nominal diameter of the nail, Dev. Dia is the developed diameter after forming the ring shanks on the nail shank, RS RPI is number of rings per linear inch of the nail, Coating indicates whether the nail tip was coated with an ease of drive coating, St Ht. is the standing height of the nail above the substrate into which it was driven after driving (how much the nail stood above the substrate), Hld Pwr is the holding power of the nail in pounds (the force required to extract the nail from the material) and BY is the ending yield of the nail. The material into which the nails were driven is a laminated veneer lumber (LVL) which is a hard, engineered wood product.

A second sampling of nails were prepared and tested to compare nails made in accordance with embodiments of the present method to known nails. In this test, samples of European 3.1 mm (0.121 in nom.), EU galvanized (95 percent zinc, 5 percent aluminum plating) and US hot dipped galvanized (100 percent zinc plating) round and spline nails were tested. All of the nails were pre-plated. Some of the nails were ring shanks at 24 rings per inch. Some of the nails were coated post formation with an ease of drive coating. The standing height (the height of the nail above the substrate after driving into the substrate) and the holding power were determined. The results of the tests are shown below in Table 2.

| Sample No. | Type | Dia. (in) | Dev. Dia | RS RPI | Coating | Plating type | St. ht. | Hld Pwr |
|---|---|---|---|---|---|---|---|---|
| 6 | EU round | 0.121 | 0.129 | 24 | No | EU | 0.322 | 695.7 |
| 7 | EU round | 0.121 | na | Na | Yes | EU | Sub-flush | 662.4 |
| 8 | Spline EU | 0.121 | na | na | Yes | US | Sub-flush | 520.5 |
| 9 | Spline EU | 0.121 | 0.132 | 24 | Yes | US | 1.043 | 679.0 |
| 10 | Spline EU | 0.121 | 0.132 | 24 | Yes | EU | .903 | 717.5 |
| 11 | Spline EU | 0.121 | 0.128 | 24 | No | EU | .515 | 698.0 |
| 12 | Spline EU | 0.121 | 0.128 | 24 | Yes | EU | .483 | 647.9 |

In Table 2, Type indicates the type of nail, either an EU round nail or an EU spline nail, Dia. (in) is the nominal diameter of the nail, Dev. Dia is the developed diameter after forming the ring shanks on the nail shank, RS RPI is number of rings per linear inch of the nail, Coating indicates whether the nail tip was coated with an ease of drive coating, St. Ht. and Hld Pwr are as noted above with respect to Table 1, and the material into which the nails were driven is LVL.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for making a plated spline nail, comprising:
    plating an elongated wire with a corrosion resistant material to form a pre-plated elongated wire, the corrosion resistant material comprising zinc;
    passing the pre-plated elongated wire through a forming machine having rollers configured with protrusions formed thereon and extending outwardly therefrom to form an odd number of grooves in the pre-plated elongated wire, the grooves being formed such that no two grooves are 180 degrees opposed to one another;
    applying a lubricant to the pre-plated elongated wire and/or the forming machine prior to passing the pre-plated elongated wire through the forming machine to form grooves in the pre-plated elongated wire;
    cutting the pre-plated elongated wire to a pre-pleated elongated wire of a desired length; and
    forming a head, and a point on the pre-plated elongated wire of desired length to form the plated spline nail.

2. The method of claim 1 further including forming ring shanks on the plated spline nail.

3. The method of claim 2 including applying a lubricant to the plated spline nail prior to forming the ring shanks on the plated spline nail.

4. The method of claim 1 including cleaning the plated spline nail after forming the nail.

5. The method of claim 1 wherein forming a head on the pre-plated elongated wire of desired length includes forming a full round head on the pre-plated elongated wire of desired length.

6. The method of claim 1 including forming the grooves asymmetrically about the circumference of the shank.

7. The method of claim 6 wherein the grooves are formed such that no two grooves are 180 degrees opposed to one another.

* * * * *